United States Patent [19]

Shibuya et al.

[11] Patent Number: 4,668,172
[45] Date of Patent: May 26, 1987

[54] COMPRESSOR HAVING DISCHARGE VALVE MEANS ADAPTED TO ENHANCE THE COEFFICIENT OF PERFORMANCE OF THE COMPRESSOR

[75] Inventors: Tsunenori Shibuya; Yutaka Ishizuka, both of Konan, Japan

[73] Assignee: Diesel Kiki Co., Ltd., Tokyo, Japan

[21] Appl. No.: 783,834

[22] Filed: Oct. 3, 1985

Related U.S. Application Data

[63] Continuation-in-part of Ser. No. 575,889, Feb. 1, 1984, abandoned.

[30] Foreign Application Priority Data

Feb. 12, 1983 [JP] Japan ................... 58-19292

[51] Int. Cl.[4] ............... F04C 18/344; F04C 29/00
[52] U.S. Cl. ..................... 418/270; 137/512.15; 137/856
[58] Field of Search .............. 418/259, 266–270; 137/512.15, 855, 856

[56] References Cited

U.S. PATENT DOCUMENTS

| | | | |
|---|---|---|---|
| 2,151,746 | 3/1939 | Cody | 137/856 |
| 2,798,505 | 7/1957 | Kehler | 137/512.15 |
| 3,200,838 | 8/1965 | Sheaffer | 137/512.15 |
| 3,809,511 | 5/1974 | Linder et al. | 418/270 |
| 3,852,003 | 12/1974 | Adalbert et al. | 418/268 |
| 3,858,605 | 1/1975 | Bauer et al. | 137/512.15 |
| 4,149,834 | 4/1979 | Eiermann | 137/512.15 |
| 4,168,722 | 9/1979 | Mayer et al. | 137/856 |
| 4,241,758 | 12/1980 | Eiermann | 137/512.15 |
| 4,305,424 | 12/1981 | Wankel | 137/512.15 |

FOREIGN PATENT DOCUMENTS 54-159701 12/1979 Japan .

Primary Examiner—John J. Vrablik
Assistant Examiner—Jane E. Obee
Attorney, Agent, or Firm—Frishauf, Holtz, Goodman & Woodward

[57] ABSTRACT

A cylinder has at least one valve seating surface-forming portion which has an outer surface formed therein with at least one recess, the bottom surface of which serves as a valve seating surface. A discharge valve is arranged on the valve seating surface-forming portion to close or open outlet holes each formed in corresponding ones of the valve seating surface. The discharge valve has at least one valve body formed of an elastic plate member disposed in close contact with a corresponding one of the valve seating surface. Preferably, the valve seating surface is arcuately concavely curved and the corresponding valve body has a correspondingly curved surface. The outlet holes are each formed in a thinnest portion of the valve seating surface-forming portion.

11 Claims, 8 Drawing Figures

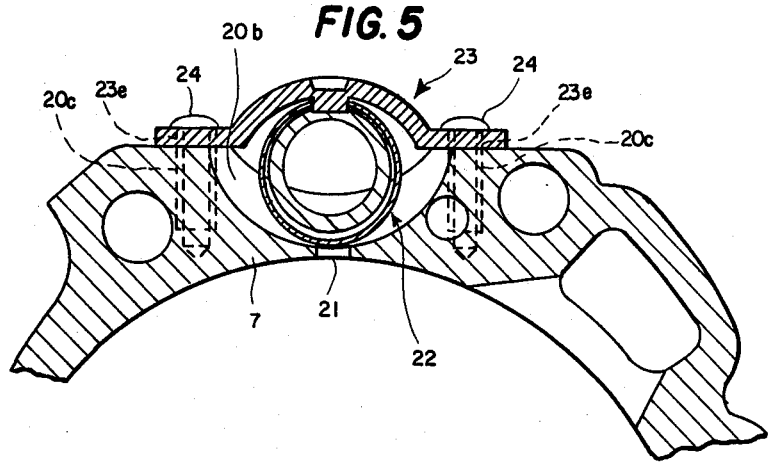
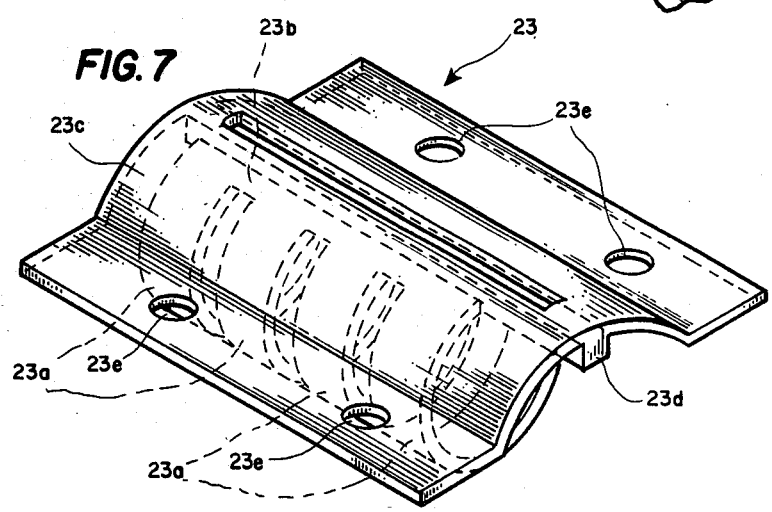
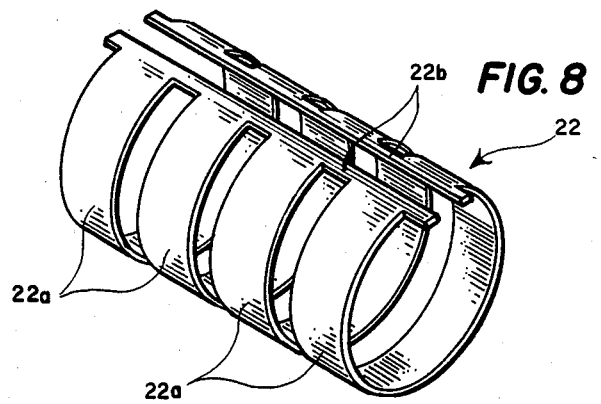

COMPRESSOR HAVING DISCHARGE VALVE MEANS ADAPTED TO ENHANCE THE COEFFICIENT OF PERFORMANCE OF THE COMPRESSOR

This is a continuation-in-part of copending, application Ser. No. 575,889, filed Feb. 1, 1984, now abandoned.

BACKGROUND OF THE INVENTION

This invention relates to a compressor which has discharge valve means adapted to enhance the coefficient of performance of the compressor.

In a compressor in general, which compresses fluid, a cylinder accommodating a piston or a rotor has an outer surface formed thereon with at least one flat valve seating surface at a predetermined location and also formed therein with outlet holes communicating with a pump working chamber defined between an inner surface of the cylinder and the piston or the rotor, and a discharge valve is arranged over the valve seating surface to close and open the outlet holes. The minimum possible thickness of the outer wall of the cylinder should be more than a value corresponding to required yield strength of the compressor. Accordingly, also a portion of the cylinder wall formed with the above valve seating surface has to have a sufficient thickness at least equal to the minimum possible thickness. However, if the above portion of the cylinder wall has such a sufficient thickness, the internal spaces of the outlet holes have a considerably large overall volume, as is the case with a conventional compressor. This large internal volume of the outlet holes forms a great part of the dead volume of the compression space of the compressor, i.e. a great part of the clearance volume of the pump working chamber formed at the termination of the compression stroke, resulting in degraded coefficient of performance of the compressor.

This is also the case with a conventional vane compressor which has a cylinder having an endless camming inner peripheral surface, and a rotor rotatably received within the cylinder and carrying vanes slidably fitted therein, wherein pump working chambers are defined between the endless camming inner peripheral surface, the outer peripheral surface of the rotor, and adjacent ones of the vanes. That is, the aforementioned problem of degraded coefficient of performance is caused by a series of outlet holes with a large internal volume, formed through the peripheral wall of the cylinder and communicating with a pump working chamber on the compression stroke. To be specific, when tip of a preceding vane passes the outlet holes opening in the camming inner peripheral surface of the cylinder, residual compressed gas in the internal spaces of the outlet holes leaks into a pump working chamber on the compression stroke defined by the succeeding vane. Consequently, in the pump working chamber on the compression stroke, the internal pressure increases, resulting in an increase in the power required for the compression and accordingly increased energy loss of the compressor. Also, the leaked compressed gas is again compressed, causing an increase in the temperature of the discharge gas.

To overcome these disadvantages, there has been proposed a discharge valve for refrigerant compressors, e.g. by Japanese Provisional Patent Publication (Kokai) No. 54-159701. The proposed discharge valve has a valve body provided with protruberances projected into respective outlet holes and serving to substantially reduce the internal volumes of the outlet holes.

However, the proposed discharge valve has several drawbacks. For instance, the protuberance causes an increase in the inertial mass of the valve body, degradating the valve closing and opening responsiveness to changes in the pressure of the compressed gas, and that the discharge valve has a complicated structure and accordingly is disadvantageous in respect of workability and assemblage.

SUMMARY OF THE INVENTION

It is an object of the invention to provide a compressor having a discharge valve means which is capable of reducing the dead volume of the compression space in a pump working chamber without reducing the yield strength of the cylinder, thereby improving the coefficint of performance and preventing an increase in the discharge gas temperature.

It is a further object of the invention to provide a compressor having a discharge valve means which has a valve body with a high closing and opening responsiveness to changes in the compressed gas pressure.

According to the invention, there is provided a compressor having a cylinder, and fluid pressurizing means movably arranged within the cylinder for cooperating with the inner surface of the cylinder to define at least one pump working chamber which performs suction of compression fluid and/or compression of same. The cylinder has at least one valve seating surface-forming portion which has an outer surface formed therein with at least one recess. The recess has a bottom surface serving as a valve seating surface. Formed in the valve seating surface-forming portion is at least one outlet hole which has one end opening in a corresponding one of the at least one valve seating surface and the other end opening in the inner surface of the cylinder and facing a corresponding one of the pump working chambers which is on a compression stroke. A discharge valve is arranged on the outer surface of the valve seating surface-forming portion to close and open the outlet hole. The discharge valve is formed of an elastic plate member having an arcuate cross section, and has at least one valve body having its outer peripheral surface disposed at least in part in close contact with a corresponding one of the at least one valve seating surface. Stopper means is provided which prevents excessive movement of the valve body of the discharge valve. Fixing means is provided which fixes the stopper means to the outer surface of the valve seating surface-forming portion.

The above and other objects, features and advantages of the invention will be more apparent from the ensuing detailed description taken in conjunction with the accompanying drawings.

BRIEF DESCRIPTION OF THE DRAWINGS

FIG. 5 is a similar view to FIG. 2, illustrating a second embodiment of the present invention;

FIG. 7 is a perspective view illustrating a stopper appearing in FIGS. 5 and 6; and FIG. 8 is a perspective view illustrating a discharge valve appearing in FIGS. 5 and 6.

DETAILED DESCRIPTION

Figure 1:
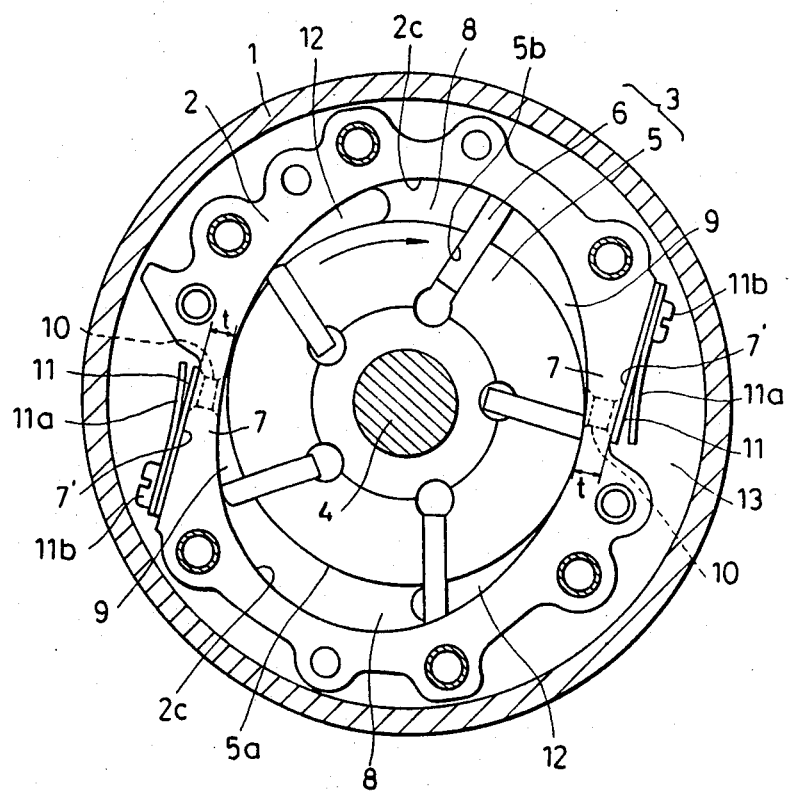
FIG. 1 is a schematic transverse cross-sectional view of a conventional vane compressor.

Referring first to FIG. 1, there is illustrated, by way of example, a conventional vane compressor. Accommodated within a casing 1 is a cylinder 2 in which is rotatably arranged a rotary type fluid pressurizing means 3 which comprises a rotor 5 rigidly fitted on a rotary shaft 4, and a plurality of vanes 6 radially slidably fitted, respectively, in as many axial slits 5a formed in the outer peripheral surface of the rotor 5. The cylinder 2 has its peripheral wall formed with two valve seating surface-forming portions 7 and 7 at diametrically opposite locations, each having a minimum thickness $t'$ set at a value at least equal to a value corresponding to required yield strength of the compressor. Each of the portions 7, 7 has a valve seating surface 7' formed on its outer surface, and formed therein with axially arranged outlet holes 10, only one of which is shown and which each open at one end in the valve seating surface 7', and open at the other end in the camming inner peripheral surface 2c of the cylinder 2 and facing one of pump working chambers 9 on the compression stroke, the chambers 9 and pump working chambers 8 on the suction stroke being defined between the same camming inner peripheral surface 2c, the outer peripheral surface 5a of the rotor 5, and adjacent vanes 6. A discharge valve 11 is arranged on the outer surface of each valve seating surface-forming portion 7 to close and open the outlet holes 10, and fastened to the same outer surface, by means of bolts 11b threadedly fitted in the same outer surface, together with a stopper 11a for preventing excessive movement of the discharge valve 11.

With the above arrangement, when the rotor 5 is rotated together with the rotating rotary shaft 4, the vanes 6 are correspondingly circumferentially moved with their tips in sliding contact with the camming inner peripheral surface 2c of the cylinder 2, while radially moving in their respective slits 5b. As the pump working chambers 8 on the suction stroke increase in volume, compression gas is sucked into them through respective groups of inlet holes 21, while as the pump working chambers 9 on the compression stroke decrease in volume, the sucked gas is compressed. During the following delivery stroke of the chambers 9, the compressed gas forcibly opens the discharge valves 11 through the outlet holes 10 and is discharged into a discharge pressure chamber 13 defined between the casing 1 and the cylinder 2.

However, since the outlet holes 10, which each have a length nearly equal to the aforementioned thickness t, each have a considerable internal volume, when the preceding vanes 6 pass their associated groups of outlet holes 10 during the delivery stroke, a considerable amount of compressed gas remaining in the outlet holes 10 leaks into the pump working chambers 9 defined by the succeeding vanes 6, causing degradation of the coefficient of performance of the compressor, etc. as previously stated.

Figure 2:
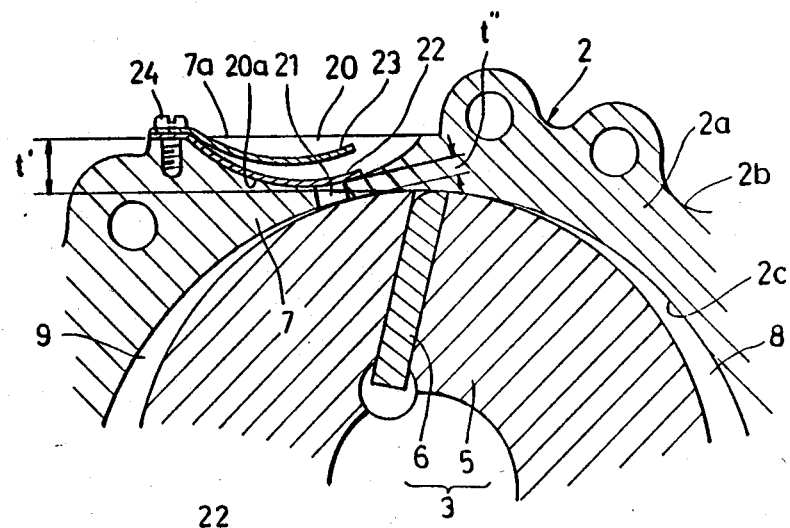
FIG. 2 is a fragmentary transverse cross-sectional view of a vane compressor according to a first embodiment of the present invention, illustrating in detail a discharge valve and its peripheral parts.
Figure 3:
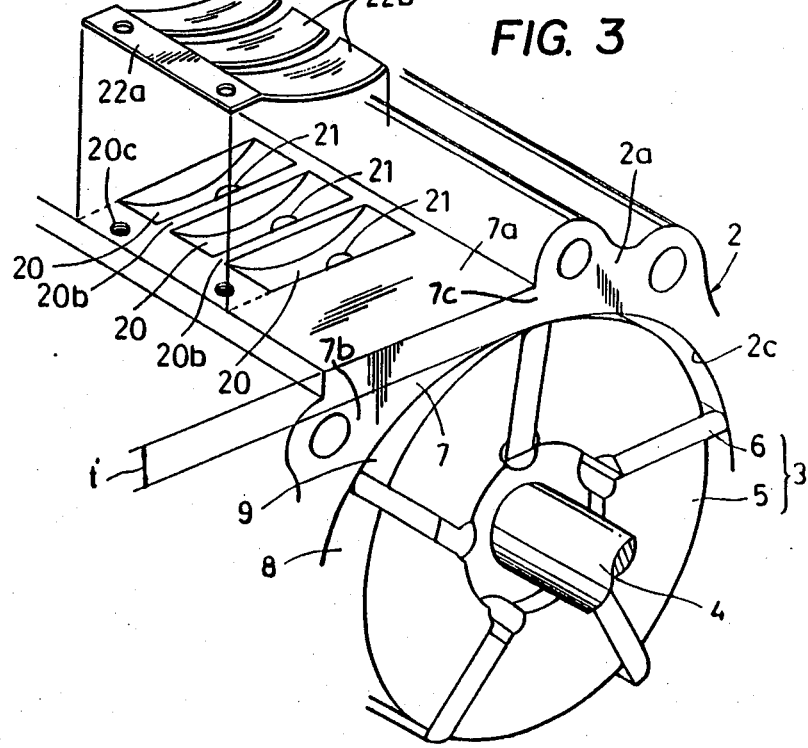
FIG. 3 is a schematic fragmentary perspective view of the compressor of FIG. 2, partly omitted and partly exploded, illustrating a valve seating surface-forming portion and its peripheral parts.

Referring next to FIGS. 2 and 3, there is illustrated a first embodiment of the present invention which is applied to a vane compressor having a basic structure identical with the compressor of FIG. 1. In these figures, elements and parts corresponding to those of the compressor in FIG. 1 are designated by identical reference numerals.

In FIGS. 2 and 3, a valve seating surface-forming portion 7 corresponding to the portions 7, 7 shown in FIG. 1, forms part of the peripheral wall 2a of a cylinder 2. Two such portions 7 and 7 may be provided on the cylinder 2 at diametrically opposite locations, as in the compressor of FIG. 1. In the illustrated embodiment, the valve seating surface-forming portion 7 other than a portion thereof in which grooves 20, hereinafter referred to, are formed has a thickness progressively decreasing from one circumferential end 7b to the opposite circumferential end 7c, as best shown in FIG. 3, the minimum thickness $t'$ at the latter being set at a value slightly larger than a minimum allowable value corresponding to required yield strength of the compressor. The valve seating surface-forming portion 7 has a flat surface 7a which is formed therein with three rectangular grooves 20 which are juxtaposed axially of the cylinder 2 and each circumferentially extend and have an arcuate, i.e. concavely curved bottom surface 20a. The valve seating surface-forming portion 7 is formed therein with three radial outlet holes 21 which each open at one end in a deepest portion of the bottom surface 20a of a corresponding one of the grooves 20, and open at the other end in the camming inner peripheral surface 2c of the cylinder 2. The other end of each outlet hole 21 faces a corresponding one of pump working chambers 9 on the compression stroke similar to those in FIG. 1.

The peripheral wall 2a of the cylinder 2 formed with the above grooves 20 can have overall yield strength substantially equal to that of the cylinder peripheral wall of FIG. 1, if the minimum thickness $t'$ of the valve seating surface-forming portion 7 of the peripheral wall 2a in FIG. 2 is set at an appropriate value slightly larger than the minimum thickness t in FIG. 1, even though the thickness $t''$ of the peripheral wall 2a between a deepest portion of the arcuate bottom surface 20a of each groove 20 and the camming inner peripheral surface 2c of the cylinder is set at a value much smaller than the minimum thickness t of the cylinder peripheral wall in FIG. 1. This remarkable effect is presumably obtained by the following reasons: First, the arcuate shape of the bottom surface 20a of the groove 20 causes stresses applied on the same surface to be distributed evenly over the surface, minimizing the concentration of stresses on a local point of the same surface. Secondly, from the viewpoint of strength of materials, stresses developed in the peripheral wall 2a of the cylinder 2 by application of internal pressure to the same wall are larger toward the camming inner peripheral surface 2c than toward the outer surface of the cylinder 2. Therefore, the formation of grooves 20 in the outer surface of the peripheral wall 2a does not cause a substantial decrease in the overall yield strength of the peripheral wall 2a. Thirdly, the formation of grooves 20 merely causes a reduction in the thickness of the peripheral wall 2a at zones in the vicinity of the outlet holes 21 of the valve seating surface-portion 7 alone, which zones occupy only a small percentage of the whole surface area of the peripheral wall 2a of the cylinder 2.

To well achieve the object of the invention of reducing the internal volume of the outlet holes 21, the above-mentioned thickness t″ of the peripheral wall 2a between a deepest portion of the arcuate bottom surface 20a of each groove 20 and the camming inner peripheral surface 2c of the cylinder 2 should be set at a minimum possible value, insofar as the peripheral wall 2a has required overall yield strength. The yield strength of the peripheral wall 2a depends not only upon the thickness of the peripheral wall at the bottom surfaces 20a of the grooves 20 but also upon the radius of curvature and surface area of the bottom surfaces 20a. Therefore, to satisfy the above-mentioned requirement, the radius of curvature and surface area of the bottom surfaces 20a should be taken into account in setting the value of the thickness t″. To be specific, the thickness t″ can be set to smaller values as either the radius of curvature of the bottom surface 20a or the surface area of same becomes smaller.

Ribs 20b and 20b are formed integrally with the valve seating surface-forming portion 7 in a manner separating adjacent ones of the grooves 20 from each other.

A discharge valve 22 is disposed over the valve seating surfaces 20a so as to close and open the outlet holes 21. The discharge valve 22 comprises a base plate 22a, and three valve bodies 22b each formed of an elastic plate member such as Swedish steel, secured at one end to the base plate 22a and juxtaposed to each other. Each of the valve bodies 22b has an arcuate shape and is laid over the arcuate bottom surface 20a of its corresponding groove 20, for close contact therewith. Three plate-like stoppers 23 for preventing excessive movements of the valve bodies 22b each have a shape corresponding to that of the valve bodies 22b are laid over their respective valve bodies 22b. The stoppers 23 each have one end laid over the base plate 22a and fastened to the outer surface 7a of the valve seating surface-forming portion 7 together with the base plate 22a, by means of set screws 24 extending through the members 22b, 23 and threadedly fitted in tapped holes 20c formed in the same outer surface 7a.

The elements and parts of the compressor of FIGS. 2 and 3 other than those described above are constructed and arranged in a manner similar to that of the compressor of FIG. 1, description of which is therefore omitted.

With the above described arrangement of the invention, during operation of the compressor, the pressure of compressed gas in the pump working chamber 9 on the delivery stroke acts upon the valve bodies 22b of the discharge valve 22 through the outlet holes 21 to cause radially outward displacement of the valve bodies 22b to open the respective outlet holes 21, whereby the compressed gas is discharged through the opened outlet holes 21.

Figure 4:
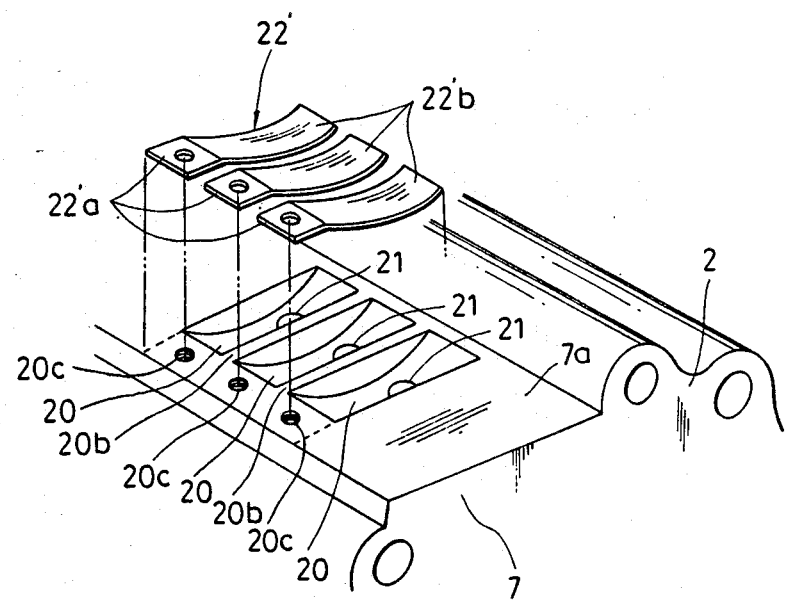
FIG. 4 is a similar view to FIG. 3, illustrating a variation of the discharge valve.

Further, in lieu of the single discharge valve 22 with three juxtaposed valve bodies 22b, a plurality of, e.g. three, independent discharge valves 22′ may be employed in a compressor according to the invention, as shown in FIG. 4. In FIG. 4, each of the discharge valves 22′ has a base plate 22′a, and a valve body 22′b formed integrally with the base plate 22′a and disposed for close contact with the valve seating surface 20a of its corresponding groove 20. The base plates 22a are each fastened to the outer surface 7a of the valve seating surface-forming portion 7 by fastening means similar to the one 24, 20c of the compressor of FIGS. 2 and 3, together with a stopper, not shown, similar to the stoppers 23 of FIGS. 2 and 3.

FIGS. 5 through 8 illustrate a second embodiment of the invention, wherein elements and parts corresponding to those of the compressor in FIGS. 2 and 3 are designated by identical reference numerals.

Figure 6:
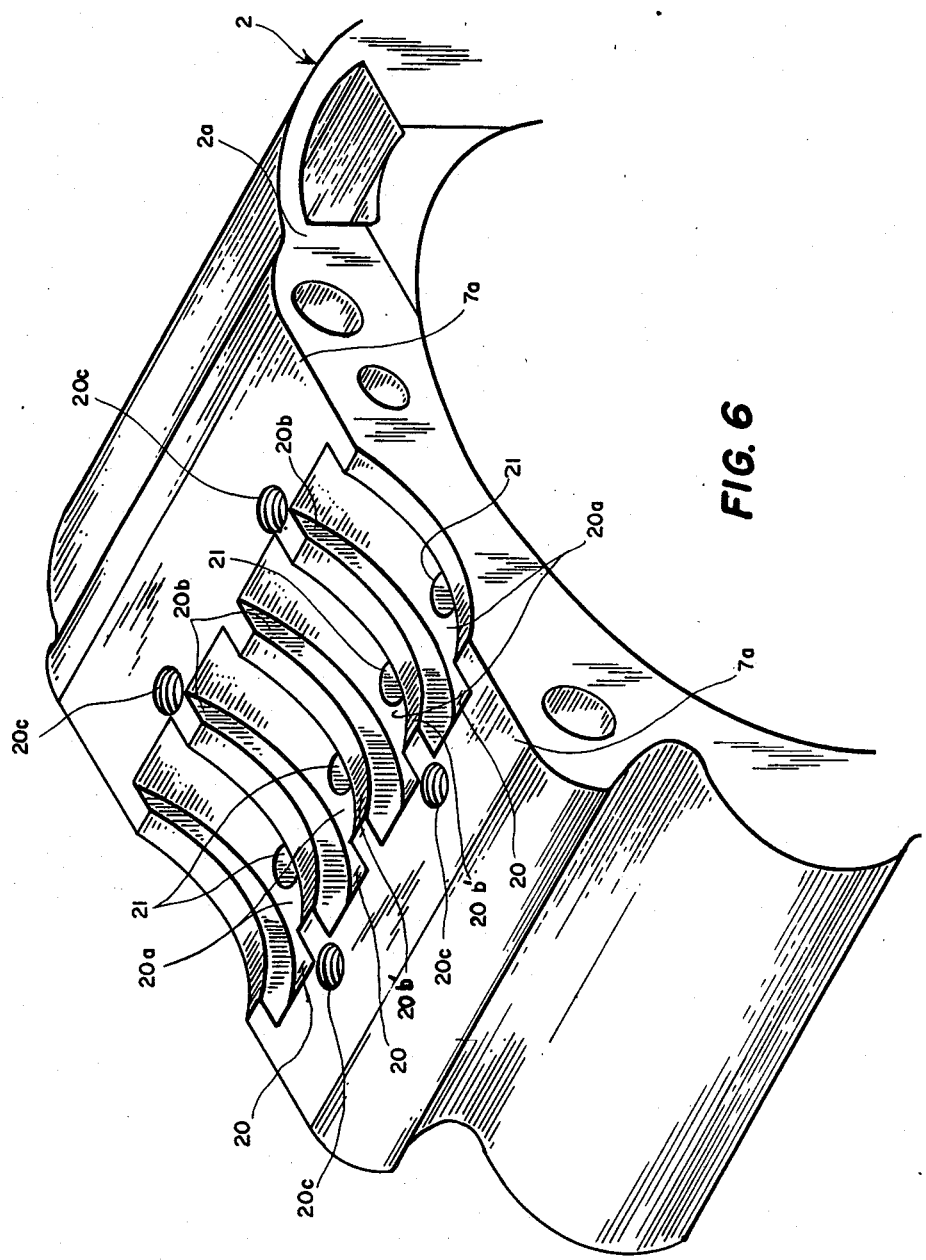
FIG. 6 is a similar view to FIG. 3, illustrating the second embodiment of the present invention.

Ribs 20b are formed integrally with the valve seating surface-forming portion 7 in a manner separating adjacent ones of four grooves 20 from each other. Each rib 20b has its outer side surface formed with an arcuate recess 20b′, as best shown in FIG. 6, for facilitating machining of the cylinder 2 for formation of the grooves 20. Alternatively, a rectangular recess may be formed in the outer side surface of each rib 20b.

A discharge valve 22 is formed of an elastic sheet member, such as Swedish steel, which is curved so as to have a C-shaped cross section. As shown in FIG. 8, the discharge valve 22 comprises four valve bodies 22a each having a C-shaped cross section, which are juxtaposed to each other at predetermined intervals, and a pair of supporting portions 22b formed integrally with the valve bodies 22a at opposite side edges thereof, i.e. at a side of the valve bodies 22a remote from the bottom surfaces 20a of the grooves 20, and axially extending to connect the valve bodies 22a with each other. The valve bodies 22a of the discharge valve 22 are each laid over the arcuate bottom surface 20a or the valve seating surface of its corresponding one of the grooves 20, in close contact therewith.

A stopper 23 is formed of a metal plate which is somewhat thicker than the discharge valve 22, and comprises, as shown in FIG. 7, a cylindrical portion which is formed with four stopper portions 23a juxtaposed to each other at predetermined intervals, and also with a connecting portion 23b integral with the stopper portions 23a at a side thereof remote from the valve seating surfaces 20a and axially extending to connect the stopper portions 23a with each other, a cover 23c formed of a plate member having an arcuately curved central portion, and a ridge 23d formed integrally with an arcuately recessed inner surface of the cover 23c and secured to the connecting portion 23b, e.g. by brazing. The ridge 23b may be formed integrally with the cover 23c, e.g. by casting. Each stopper portion 23a has its outer peripheral surface disposed opposite the inner peripheral surface of its corresponding valve body 22a in a manner spaced therefrom. The cover 23c has its opposite side edges formed with through holes 23e, and is fastened to the outer surface 7a of the valve seating surface-forming portion 7 by means of set screws 24 (only two of which are shown in FIG. 5) threadedly fitted in tapped holes 20c formed in the outer surface 7a, through the through holes 23e.

To mount the discharge valve 22 and the stopper 23 onto the outer surface 7a of the valve seating surface-forming portion 7, first, the discharge valve 22 is deformed by forcing circumferentially opposing side edges of the paired supporting portions 22b away from each other and bringing the same opposing side edges of the supporting portions 22b into urging contact or engagement with opposite lateral side surfaces of the ridge 23d of the stopper 23, to thereby mount the discharge valve 22 on the cylindrical portion of the stopper 23. Next, the valve bodies 22a of the discharge valve 22 are inserted into the respective recesses 20 while they are held in a state thus mounted on the stopper 23. Finally, the cover 23c of the stopper 23 is fastened to the outer surface 7a of the valve seating surface-forming portion 7 in the above stated manner. In this way, the discharge valve 22 is brought into a position shown in FIG. 5.

That is, the valve bodies 22a of the discharge valve 22 have part of their outer peripheral surfaces disposed in close contact with the arcuate bottom surfaces 20a of the corresponding grooves 20, and their inner peripheral surfaces facing the outer pheripheral surfaces of the respective stopper portions 23a of the stopper 23 in a manner spaced therefrom.

The elements and parts of the compressor of FIGS. 5 through 8 other than those described above are constructed and arranged in a manner similar to those of the compressor of FIG. 1 or FIGS. 2 and 3, description of which is therefore omitted.

With the above described arrangement according to the second embodiment of the invention, during operation of the compressor, the pressure of compressed gas in the pump working chamber 9 on the delivery stroke acts upon the valve bodies 22a of the discharge valve 22 through the outlet holes 21. Since the valve bodies 22a of the discharge valve 22 is in engaging contact with the opposite lateral side surfaces of the ridge 23d of the stopper 23, and at the same time in urging contact with the inner surface of the curved central portion of the cover 23c, the pressure of the compressed gas acting upon the valve bodies 22a forcibly deforms same so as to make the part of their outer peripheral surfaces somewhat flat and detached from the bottom surfaces 20a of the grooves 20, whereby the compressed gas is discharged through the opened outlet holes 21 and gaps between the flattened valve bodies 22a and the bottom surfaces 20a. When the discharge of the compressed gas is terminated, the valve bodies 22a of the discharge valve 22 returns to the position shown in FIG. 5 by their own elasticity or force of restitution.

Although the foregoing embodiments are applied to a vane compressor, the present invention may be applied not only to other type rotary compressors but also to reciprocating compressors.

The invention having the above described arrangement can provide the following excellent results:

(i) Since recesses 20 are formed in the outer surface of a valve seating surface-forming portion 7 of the peripheral wall 2a of the cylinder 2 to reduce the thickness of part of the portion 7 formed with outlet holes 21 and accordingly largely reduce the length of the outlet holes 21, the overall internal volume of the outlet holes 21 can be largely reduced as compared with the conventional compressor, thereby preventing a reduction in the coefficient of performance of the compressor, an increase in the discharge gas temperature, etc. Further, since the above recesses 20 each have an arcuate bottom surface 20a, stresses can be applied uniformly over the whole surface 20a, thereby enabling to set the minimum thickness of the valve seating surface-forming portion 7 at a very small value.

(ii) Since the discharge valve 22 has valve bodies each formed of an elastic plate member with an arcuate shape corresponding to the arcuate valve seating surface, the valve bodies can be brought into close contact with the respective valve seating surfaces, thereby obtaining positive valve closing actions. Further, according to the first embodiment of the invention, the valve bodies each have a plate-like shape without any protuberance or the like, their inertial mass is enough to attain a high degree of valve closing and opening responsiveness. Moreover, the grooves 20 and the discharge valve 21 are both simple in structure, facilitating formation, manufacture or assemblage thereof.

(iii) Since the discharge valve 22 has a plurality of split or separate valve bodies disposed for closing and opening their respective outlet holes 21, thereby further enhancing the valve closing and opening responsiveness and attaining more positive valve closing and opening actions as compared with a single large valve body.

(iv) Ribs 20b formed on the valve seating surface-forming portion 7 between adjacent grooves 20 can impart the compressor with required yield strength even if the valve seating surface-forming portion has a small thickness.

(v) Further, according to the seocnd embodiment of the invention, the arcuate valve bodies of the discharge valve 22 are, through the paired supporting portions formed integrally therewith, disposed in engaging contact with opposite lateral side surfaces of the ridge 23d of the stopper 23 located radially outward of the outlet holes 21, and at the same time in urging contact with the inner surface of the curved central portion of the cover 23c formed integrally with the ridge 23d and fastened to the outer surface 7a of the valve seating surface-forming portion 7 at circumferentially opposite sides thereof with respect to the grooves 20. Therefore, the valve bodies of the discharge valve 22 are permanently supported at their respective opposite ends by the stopper 23 through the supporting portions, and at the same time, the valve bodies of the discharge valve 22 are permanently urged radially inward, i.e. toward the outlet holes 21, by the stopper 23 through the supporting portions. As a result, when the valve bodies are closed, their outer peripheral surfaces can be held in positive close contact with the arcuately concavely curved valve seating surfaces, at least along the perimeter of the outlet holes 21, to thereby improve the sealing effect of the valve bodies, as well as obtain positive closing and opening action of the discharge valve 22.

Obviously modifications and variations of the present invention are possible in the light of the above disclosure. It is therefore to be understood that within the scope of the appended claims the invention may be practiced otherwise than as specifically described.

What is claimed is:

1. A compressor comprising:
a cylinder having an inner surface and an outer peripheral surface, said inner surface including a circumferentially curved inner oeripheral surface serving as a camming surface;
fluid pressurizing means movably arranged within said cylinder, said fluid pressurizing means cooperating with said inner surface of said cylinder to define at least one pump working chamber which performs at least one of suction of compression fluid and compression of same;
at least one valve seating surface-forming portion forming part of said cylinder and having an outer surface;
at least one recess formed in said outer surface of said at least one valve seating surface-forming portion, said at least one recess having a bottom surface serving as at least one valve seating surface;
at least one outlet hole formed in said at least one valve seating surface-forming portion, said at least one outlet hole having one end opening in a corresponding one of said at least one valve seating surface and another end opening in said inner surface of said cylinder and facing a corresponding one of said at least one pump chamber on a compression stroke;

at least one discharge valve arranged on said outer surface of said at least one valve seating surface-forming portion for closing and opening at least one outlet hole, said at least one discharge valve being formed of an elastic plate material having an arcuate cross section and having at least one valve body having an outer peripheral surface disposed at least in part in direct contact with a corresponding one of said at least one valve seating surface;

said at least one valve seating surface being arcuately concavely curved, said at least one valve body of said discharge valve having a curved shape corresponding to said arcuately concavely curved valve seating surface;

said at least one recess comprising a plurality of grooves formed in said outer surface of said at least one valve seating surface-forming portion in a manner facing radially outwardly and circumferentially extending parallel with each other, said grooves each having a bottom surface as one of said at least one valve seating surface, and at least one rib interposed between adjacent ones of said grooves, said at least one rib extending along the whole lengths of said adjacent ones of said grooves and completely separating adjacent grooves from each other;

stopoer means for preventing excessive movement of said at least one valve body of said at least one discharge valve, said stopper means having stopper portions corresponding in number to the number of said at least one valve body of said discharge valve, said stopper means having a cover in the form of a plate having a circumferentially central portion curved concavely in a manner defining a second recess facing toward said at least one recess and cooperating therewith to define a space accommodating therein said at least one valve body;

and fixing means fixing said stopper means to said outer susrface of said at least one valve seating surface-forming portion;

said fluid pressurizing means comprising a rotor rotatably received within said cylinder, said rotor having an outer peripheral surface formed therein with a plurality of axial slits, a plurality of vanes radially slidably fitted, respectively, in said axial slits and disposed for sliding contact with said inner peripheral surface of said cylinder, adjacent ones of said vanes cooperating with said inner surface of said cylinder and said outer peripheral surface of said rotor to define therbetween said pump working chamber;

said at least one discharge valve including a pair of supporting portions each formed integrally with said at least one valve body at a side remote from a corresponding one of said at least one valve seating surface and extending axially, said pair of supporting portions having circumferentially opposing side edges, said stopper means including a connecting portion formed integrally with said stopper portions at a side remote from a corresponding one of said at least one valve seating surface and extending axially, a fixed portion having an inner surface, and a ridge interposed between said fixed portion and said connecting portion for combining same, said ridge having opposite lateral side surfaces;

said at least one valve seating surface-forming portion having a portion with a smallest thickness, said at least one outlet hole being formed in said smallest thickness portion of said at least one valve seating surface-forming portion; and said opposing side edges of said pair of supporting portions of said at least one discharge valve being disposed in permanent engaging contact with said opposite lateral side surfaces of said ridge of said stopper means.

2. A compressor as claimed in claim 1, wherein said at least one valve body of said at least one discharge valve corresponds in number to the number of said at least one groove juxtaposed to each other, and arranged, respectively, in said at least one groove.

3. A compressor as claimed in claim 1, wherein each of said ribs has an outer surface concavely curved in the radial direction.

4. A compressor as claimed in claim 1, wherein said fixed portion of said stopper means has an intermediate radially outwardly curved portion, said opposing side edges of said supporting portions of said at least one discharge valve being disposed in permanent urging contact with said inner surface of said fixed portion of said stopper means at said opposite lateral side surfaces of said ridge.

5. A compressor as claimed in claim 4, wherein said at least one valve body of said at least one discharge corresponds in number to the number of said at least one groove juxtaposed to each other, and arranged, respectively, in said at least one groove.

6. A compressor as claimed in claim 1, wherein said at least one valve body of said at least one discharge valve comprises a plurality of valve bodies juxtaposed to each other at predetermined intervals each at least larger than the width of said at least one rib of said at least one recess, and connected with each other by said pair of supporting portions of said at least one discharge valve.

7. A compressor as claimed in claim 6, wherein said at least one valve body of said at least one discharge corresponds in number to the number of said at least one groove juxtaposed to each other, and arranged, respectively, in said at least one groove.

8. A compressor as claimed in claim 1, wherein said stopper means comprises a plurality of stopper portions parallel to each other at predetermined intervals each at least larger than the width of said at least one rib of said at least one recess, and connected with each other by said connecting portion of said stopper means.

9. A compressor as claimed in claim 8, wherein said at least one valve body of said at least one discharge corresponds in number to the number of said at least one groove juxtaposed to each other, and arranged, respectively, in said at least one groove.

10. A compressor as claimed in claim 1, wherein said stopper portions of said stopper means and said connecting portion thereof are shaped in the form of a hollow cylinder.

11. A compressor as claimed in claim 10, wherein said at least one valve body of said at least one discharge corresponds in number to the number of said at least one groove juxtaposed to each other, and arranged, respectively, in said at least one groove.

* * * * *